3,772,437
HETEROCYCLIC AMINES AS ANTIFUNGAL ACTIVE SUBSTANCES

Karl Gätzi, Basel, Switzerland, assignor to Geigy-Chemical Corporation, Ardsley, N.Y.
No Drawing. Original application Nov. 22, 1968, Ser. No. 778,328, now Patent No. 3,634,401, dated Jan 11, 1972. Divided and this application Oct. 8, 1971, Ser. No. 187,887
Int. Cl. A01n 9/22
U.S. Cl. 424—244         14 Claims

ABSTRACT OF THE DISCLOSURE 2-amino-azacyclotriadecenes in which the nitrogen atom of the amino group is unsubstituted or bears certain substituents as well as their addition salts with acids are described as antifungal agents the effectiveness of which is considerably superior to that of the known 2-amino-azacycloheptenes. A typical compound is 2-n-butylamino-azacyclotridec-1-ene.

---

This is a division of application Ser. No. 778,328, filed on Nov. 22, 1968, now U.S. Pat. No. 3,634,401.

This invention relates to new heterocyclic amines, namely 2-amino-azacyclotridecenes and their addition salts with acids, processes for producing them, and also antifungal compositions, which contain these new compounds as active ingredients, and to a method for controlling phytopathogenic fungi with the aid of such compounds or of compositions containing such compounds as active substances.

Compounds provided by this invention comprise the new 2-amino-azacyclotridecenes which fall under the Formula I

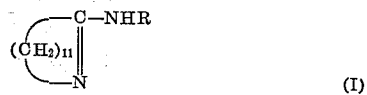

(I)

in which formula

R represents
(a) an unsubstituted or substituted alkyl radical having from 1 to 16 carbon atoms, any substituent of such alkyl group being selected from lower alkoxy, lower alkylthio, halogen particularly chlorine or bromine, amino, alkylsubstituted amino and cycloalkylamino,
(b) a cycloalkyl radical of 3 to 12 carbon atoms,
(c) an alkylamino group having 1 to 16 carbon atoms,
(d) a mononuclear arylamino group, or
(e) a phenalkyl radical any substituent of which is selected from lower alkyl, lower alkoxy and halogen particularly chlorine or bromine;

and their addition salts with inorganic and with organic acids.

Suitable cycloalkyl substituents are defined under (b) supra and cycloalkylamino substituents as mentioned under (a) are those having from 3 to 12 carbon atoms and especially those of 5 to 6 carbon atoms; the cycloalkyl rings may be substituted by lower alkyl groups. "Lower" in connection with "alkyl" means having from 1 to 4 carbon atoms.

The new 2-amino-azacyclotridecenes of Formula I are produced according to the invention by converting aza-cyclotridecan-2-one with triethyloxonium-borotetrafluoride into 2-ethoxyazacyclotridec-1-ene and reacting the latter with an amino compound of Formula II

—NH       (II)

wherein R has the meaning given under Formula I, and optionally treating the resulting reacting products with inorganic or organic acids to obtain the corresponding addition salts. It is advantageous to perform the reactions according to the invention, in solvents or diluting agents which are inert to the reactants. Suitable solvents include aliphatic and aromatic halogenated hydrocarbons, such as methylene chloride, chloroform, chlorobenzene, aromatic hydrocarbons, such as benzene, toluene, xylenes, ethers and ether-like compounds, etc. The reaction of the 2-ethoxy compound with the amine of Formula II is advantageously carried out in the presence of a tertiary amine, such as trimethylamine, triethylamine, triethanolamine pyridine, etc. During the reaction, the ethoxy group is split off forming ethanol and is replaced by the group —NHR.

The addition salts of compounds of Formula I with inorganic and organic acids, preferably agriculturally acceptable salts, are obtained by reacting equimolar amounts of a 2-amino-azacyclotridecene of Formula I with an inorganic or organic acid in the presence of a solvent or diluting agent, which is inert with respect to the reactants. Suitable inorganic acids are hydrogen halides, nitric acid, sulphuric acid and phosphoric acid. Organic acids suitable for forming commercially useful salts are formic acid, acetic acid, propionic acid, lauric acid, myristic acid, palmitic acid, stearic acid, sorbic acid, oxalic acid, succinic acid, glutaric acid, adipic acid, sebacic acid, benzoic acid, methane sulphonic acid, toluene-sulphonic acid, naphthoic acid and phthalic acid.

The new amino-azacyclotridecenes of Formula I and their addition salts with acids possess excellent antifungal properties. By virtue of their low toxocity towards warm-blooded animals and their freedom from phytotoxicty in the concentrations used for practical purposes, which is between 0.01 to 2% of active substance, calculated on the total of a spray, which is applied to the plant until dripoff, these compounds are particularly suited for plant protection.

The new 2-amino-azacyclotridecenes of Formula I exhibit excellent action against numerous phytopathogenic fungi. The new active substances are effective against fungi which cause plant diseases, for example against powdery mildews, such as powdery mildew of cucumbers (*Erysiphe cichoracearum*) and powdery mildew of roses (*Sphaerotheca pannosa*); against downy mildews, such as those causing late blight of potatoes (*Phytophthora infestans*); against leaf spot pathogens, such as *Alternaria solani*; against rusts such as bean rust (Uromyces app.), and also against the grey mould (*Botrytis cinerea*), which is particularly difficult to combat, etc. It is possible by their application to control or confine fungal infections occurring on plants, parts of plants (fruit, blossom, foliage, stems) and on parts of plants growing after treatment, particularly since the 2-amino-azacyclotridecenes of Formula I can also act as systemic fungicides. Moreover, the compounds of the invention and compositions containing them can be used for the treatment of seeds and soil. The fungal growth inhibiting amount to be used in an aqueous spray for plants or parts of plants contains 0.01–2% of active substance. The amount to be used for the treatment of soil is 0.5–10 g. per m.² or more, depending on the susceptility of the plants to be grown.

The antifungal effectiveness of the 2-amino-azacyclo-tridecene-derivatives when applied according to the invention, was determined by means of the following tests and compared with compounds known from the U.S. Pat. No. 3,255,181 or the British Pat. No. 1,049,344 or the French Pat. No. 1,367,799.

Action against *Alternaria solani* on tomatoes (*Solanum lycopersicum*)

Tomatoes of the variety "Lukullus" are sprayed, after three to four weeks cultivation in the greenhouse, with the test substance in the form of a spray suspension (conc. 0.1% active substance) until dripping wet and, after the sprayed coating has dried, they are infected with a standardised spore suspension of the fungus. After about 5 days standing in a moist atmosphere at ca. 22° C., small black spots form on the leaves. The number of spots is used as an assessment criterion for the result of the test.

Evaluation: The action is estimated according to the following scale of values:

10=ineffective, infection equal to that on untreated test plants,
9–1=reduction of infection according to linear evaluation,
0=no infection.

*Alternaria solani*

| Active substance: | Intensity of infection |
|---|---|
| 2-methylamino-azacyclotridec-1-ene | 2 |
| 2-ethylamino-azacyclotridec-1-ene | 3 |
| 2-octylamino-azacyclotridec-1-ene | 1 |
| 2-decylamino-azacyclotridec-1-ene | 2 |
| 2-dodecylamino-azacyclotridec-1-ene | 2 |
| 2-dodecylamino-azacyclohept-1-ene [1] | 10 |
| 2-decylamino-azacyclohept-1-ene [1] | 10 |

[1] Known from French Pat. 1,367,799.

Action against *Botrytis cinera* on *Vicia faba* (soya beans)

Three well developed equal sized leaves of *Vicia faba* are placed in petri dishes lined with moistened filter paper. The leaves are sprayed until dripping wet with a suspension having a concentration of 0.1% active substance, prepared from an active substance which is formulated as a wettable powder. After drying of the sprayed coating, the leaves are infected with a freshly prepared spore suspension of the fungus. After the leaves have been kept for 1–2 days in a moist atmosphere at 18–20° C., black spots, initially in the form of tiny dots, form on the leaves and quickly spread out. The number and size of the points of infection are taken as an assessment criterion for the degree of effectiveness of the test substance.

Evaluation: The effect is evaluated according to the following scale of values:

10=ineffective, infection equal to that on untreated test plants,
9–1=reduction of infection according to linear evaluation,
0=no infection.

*Botrytis cinerea*

| Active substance: | Intensity of infection |
|---|---|
| 2-octylamino-azacyclotridec-1-ene | 2 |
| 2-decylamino-azacyclotridec-1-ene | 5 |
| 2-dodecylamino-azacyclotridec-1-ene | 2 |
| 2-dodecylamino-azacyclohept-1-ene [1] | 8 |

[1] Known from French Pat. 1,367,799.

Action on *Uromyces appendicultaus* (bean rust) on beans (*Phaseolus vulgaris*)

Bean plants in the two-leaf stage are sprayed until dripping wet with a suspension of the substances in the form of wettable powders (conc. of the suspension 0.1% of active substance). After the sprayed coating has dried, the plants are infected with a fresh spore suspension of bean rust (5 plants per product), kept for 1 day in a moist chamber and then stored in a greenhouse at 20–22° C. The basis of evaluation of the test is the number of rust spots present after about 8–12 days.

Evaluation: The effect is evaluated according to the following scale of values:

10=ineffective, infection equal to that on untreated test plants,
9–1=reduction of infection according to linear evaluation,
0=no infection.

*Uromyces appendiculatus*

| Active substance: | Intensity of infection |
|---|---|
| 2-n-butylamino-azacyclotridec-1-ene | 5 |
| 2-decylamino-azacyclotridec-1-ene | 2 |
| 2-benzylamino-azacyclotridec-1-ene | 5 |
| 2-dodecylamino-azacyclohept-1-ene [1] | 10 |
| 2-decylamino-5-tert.butyl-azacyclohept-1-ene [1] | 8 |

[1] Known from French Pat. 1,367,799.

The following examples describe the production of the new compounds of the general Formula I; unless otherwise expressly stated, "parts" and "percentages" are given by weight and the temperatures are given in degrees centigrade.

Example 1

(a) To 114 g. of triethyloxonium-borotetrafluoride (prepared according to H. Meerwein, J. prakt. Chem., 154, 120 (1939)), dissolved in 300 ml. of anhydrous methylene chloride, is added dropwise at 25–30° a solution of 99 g. of azacyclotridecan-2-one in 200 ml. of anhydrous methylene chloride. After completion of the addition, the reaction mixture is stirred for 12 hours at room temperature. It is then cooled to 0–5° and mixed with 100 ml. of a 50% aqueous potassium carbonate solution. The methylene chloride phase is separated, washed with water, dried and the methylene chloride distilled off. The residue, 2-ethoxy-azacyclotridec-1-ene, has a boiling point of 92–96° at 0.05 torr.

(b) 57 g. of 2-ethoxy-azacyclotridecene-(2) are dissolved with 46.3 g. of dodecyl amine, and 3 ml. of triethyl amine in 300 ml. of anhydrous benzene, and refluxed for 16 hours. The benzene is then distilled off and the residue is fractionated. The 2-dodecyl-amino-azacyclotridec-1-ene has a boiling point of 185–188°/0.01 torr.

Example 2

7.25 g. of 2-dodecylamino-azacyclotridecene-(2) and 4.0 g. of lauric acid are dissolved in 30 ml. of hot absolute ethanol. The alcohol is subsequently distilled off under vacuum. The oily residue becomes crystalline on standing. The 2-dodecyl-amino-azacyclotridec-1-ene lauric acid salt, after recrystallising from ethyl acetate has a M.P. of 53–55°.

In the manner described in Example 1, using equimolecular quantities of 2-ethoxy-azacyclotridecene-(2) and the corresponding amine, the compounds listed in the following table were prepared.

| Compound | B.P. | M.P., deg. |
|---|---|---|
| 2-methylamino-azacyclotridec-1-ene | 72–74°/0.01 torr | |
| 2-ethylamino-azacyclotridec-1-ene | 80–82°/0.03 torr | |
| 2-isopropylamino-azacyclotridec-1-ene | 92–95°/0.02 torr | |
| 2-n-butylamino-azacyclotridec-1-ene | 100–112°/0.02 torr | |
| 2-hexylamino-azacyclotridec-1-ene | 130–133°/0.03 torr | |
| 2-octylamino-azacyclotridec-1-ene | 152–157°/0.03 torr | |
| 2-decylamino-azacyclotridec-1-ene | 172–175°/0.03 torr | |
| 2-dodecylamino-azacyclotridec-1-ene hydrochloride. | | Oil. |
| 2-dodecylamino-azacyclotridec-1-ene nitrate | | Oil |
| 2-tetradecylamino-azacyclotridec-1-ene | | 42–43 |
| 2-β-dodecylaminoethylamino-azacyclotridec-1-ene. | 200°/0.01 torr [1] | 42–44 |
| 2-benzylamino-azacyclotridec-1-ene | 150–151°/0.01 torr | |
| 2-β-aminoethylamino-azacyclotridec-1-ene | | 95–97 |
| 2-(2'-butylhydrazino)-azacyclotridec-1-ene | 132–140°/0.02 torr | |
| 2-(2'-octylhydrazino)-azacyclotridec-1-ene | 170–175°/0.02 torr | |
| 2-(2'-phenylhydrazino)-azacyclotridec-1-ene | 180–185°/0.02 torr | |
| 2-phenethylamino-azacyclotridec-1-ene | 132–136°/0.02 torr | 84–86 |
| 2-cyclohexylamino-azacyclotridec-1-ene | 168–174°/0.01 torr | |
| 2-β-ethoxyethylamino-azacyclotridec-1-ene | 128–131°/0.02 torr | |

[1] Molecular distillation.

The new 2-amino-azacyclotridecenes of the general Formula I are processed to give solid or liquid agents, such as dusting agents, sprinkling agents, granulates, wettable powders, pastes, and emulsion concentrates, solutions and aerosols. The production of such agents according to the invention is carried out in a manner known per se by intimate mixing and grinding of the active substance with suitable carriers, optionally by the addition of dispersing agents or solvents, which are inert to the active ingredient. The concentration of active substance in these agents is 0.01–80%, calculated on the total weight of the agent. The agents according to the invention can contain other biocidally active substances, and plant fertilisers, trace elements etc. These agents are used either as such as e.g. dusting agents, sprinkling agents, granulates, solutions, aerosols or they are used in the form of aqueous dispersions obtained for instance from wettable powders, pastes, emulsion concentrates by stirring with water.

In the following are described modes of preparation of the active substances for plant protection. Where not otherwise expressly stated, "parts" and "percentages" are given by weight.

Dusting agents

The following substances are used to produce a 2% dust:

2 parts of 2-decylamino-azacyclotridec-1-ene,
5 parts of colloidal silicic acid (e.g. Aerosil),
93 parts of talcum.

The above-mentioned active substance is intimately mixed and ground with the carriers. The fungicidal dust thus obtained is used for the treatment of seed beds or for the dusting of plants.

Granulate

The following substances are used to produce a 2% granulate:

(a) 4 parts of a 1:1 mixture of 2-n-butylamino-azacyclotridec-1-ene with colloidal silicic acid,
(b) 92 parts of granulated limestone,
(c) 3 parts of a mixture consisting of 0.5 part of the condensation product of $C_8$–$C_9$ alkyl-phenol and ethylene oxide in a molar ratio of 1:10 and 2.5 parts of polyethylene glycol, having an average molecular weight of about 400,
(d) 1 part of diatomaceous earth.

The limestone granules are impregnated with the mixture (c) and then mixed with the mixture (a). Diatomaceous earth is then added as anticaking agent. This granulate is particularly suitable for the treatment of plant soil.

Wettable powders

The following substances are used for producing (I) a 25% and (II) a 40% wettable powder:

(I)

(a) 25 parts of 2-octylamino-azacyclotridec-1-ene,
(b) 10 parts of a mixture of 50% of the condensation product of a higher alkanol the number of carbon atoms of which ranges from 8–18 and averages 12 and ethylene oxide in a molar ratio of 1:10 and 50% diatomaceous earth,
(c) 35 parts of diatomaceous earth, and
30 parts of colloidal silicic acid;

(II)

(a) 40 parts of dodecylamino-azacyclotridec-1-ene,
(b) 10 parts of a mixture of 40% of the condensation product of $C_8$–$C_9$ alkylphenol and ethylene oxide in a molar ratio of 1:10 and 40% of colloidal silicic acid,
(c) 50 parts of colloidal silicic acid.

The active substance (a) is first mixed with the component (b) and subsequently mixed and ground with the component (c). A wettable powder is thus obtained which is very readily wetted and suspended in aqueous media. By dilution with water, suspensions of any desired concentration of active substance can be obtained from such wettable powders, which suspensions can be used for antifungal treatment of cultivated plants.

Emulsion concentrate

The following substances are used to produce (I) a 10% and (II) a 20% emulsion concentrate:

(I)

(a) 10 parts of 2-methylamino-azacyclotridec-1-ene,
(b) 15 parts of ethoxy ethanol, 15 parts of dimethyl formamide, and 50 parts of mineral oil with a high content of aromatic substances,
(c) 10 parts of a combined emulsifier, consisting of a mixture of calcium dodecyl-benzene-sulfonate and the condensation product of octyl-phenol and ethylene oxide in a molar ratio of between 1:10 and 1:20, which mixture has a specific weight of 1.03 (at 20°), a pH of 6.5 in a 5% aqueous solution and a hydroxyl number of about 300;

(II)

(a) 20 parts of 2-ethylamino-azacyclotridec-1-ene,
(b) 70 parts of xylene,
(c) 10 parts of the emulsifier defined under (I)–(c), supra.

The active substance (a) is dissolved in xylene or in the solvent mixture (b) and to the resulting solution is then added the combined emulsifier (c). Emulsion concentrates are obtained which can be diluted with water to give emulsions of any desired concentration of active ingredient. Such emulsions are suitable for the treatment of cultivated plants.

I claim:

1. An antifungal composition comprising a 2-amino-azacyclotridecene of the Formula I

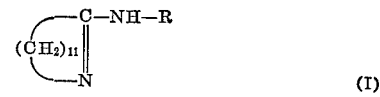

(I)

in which formula
R represents alkyl having from 1 to 14 carbon atoms, cyclohexyl, benzyl or phenethyl,
or an agriculturally acceptable addition salt thereof with an acid, in a fungal growth-inhibiting amount, and an agriculturally acceptable carrier for said compound being compatible therewith.

2. An antifungal composition as defined in claim 1, wherein the said 2-amino-azacyclotridecene is 2-methylaminoazacyclotridec-1-ene.

3. An antifungal composition as defined in claim 1, wherein the said 2 - amino-azacyclotridecene is 2-octylaminoazacyclotridec-1-ene.

4. An antifungal composition as defined in claim 1, wherein the said 2-amino-azacyclotridecene is 2-decylaminoazacyclotridec-1-ene 5. An antifungal composition as defined in claim 1 wherein the said 2-amino-azacyclotridecene is 2-dodecylaminoazacyclotridec-1-ene.

6. An antifungal composition as defined in claim 1 wherein the said 2-amino-azacyclotridecene is 2-tetradecylaminoazacyclotridec-1-ene.

7. An antifungal composition as defined in claim 1 wherein the said 2-amino-azacyclotridecene is 2-benzylaminoazacyclotridec-1-ene.

8. A method of controlling fungi comprising applying to a locus in which such control is to be effected a composition-of-matter comprising a fungal growth-inhibiting amount of a compound as defined in claim 1.

9. A method as defined in claim 8, wherein said compound is 2-methylamino-azacyclotridec-1-ene.

10. A method as defined in claim 8, wherein said compound is 2-octylamino-azacyclotridec-1-ene.

11. A method as defined in claim 8, wherein said compound is 2-decylamino-azacyclotridec-1-ene.

12. A method as defined in claim 8, wherein said compound is 2-dodecylamino-azacyclotridec-1-ene.

13. A method as defined in claim 8, wherein said compound is 2-tetradecylamino-azacyclotridec-1-ene.

14. A method as defined in claim 8, wherein said compound is 2-benzylamino-azacyclotridec-1-ene.

References Cited

UNITED STATES PATENTS

| 3,634,401 | 1/1972 | Gatzi | 260—239 |
|---|---|---|---|
| 3,255,181 | 6/1966 | Gatzi | 260—239 |

FOREIGN PATENTS

| 416,625 | 1/1967 | Switzerland. |
|---|---|---|

SHEP K. ROSE, Primary Examiner